United States Patent [19]
Rempinski et al.

[11] Patent Number: 5,125,628
[45] Date of Patent: Jun. 30, 1992

[54] SHEAVE AND CABLE ASSEMBLY FOR A TIRE LIFT/CARRIER WINCH

[75] Inventors: Donald R. Rempinski, Grand Haven; Donald R. Britt, Grand Rapids, both of Mich.

[73] Assignee: Sparton Corporation, Jackson, Mich.

[21] Appl. No.: 607,296

[22] Filed: Oct. 31, 1990

Related U.S. Application Data

[63] Continuation of Ser. No. 270,270, Nov. 11, 1988, abandoned.

[51] Int. Cl.$^5$ .............................................. B66D 1/00
[52] U.S. Cl. ...................................... 254/323; 254/376; 254/DIG. 14
[58] Field of Search ............... 254/266, 323, DIG. 14, 254/375, 376; 242/117

[56] References Cited

U.S. PATENT DOCUMENTS

| | | | |
|---|---|---|---|
| 576,779 | 2/1897 | Ettenger et al. | 254/266 X |
| 823,401 | 6/1906 | Ferris | 242/117 |
| 944,786 | 12/1909 | Hinds | 242/117 |
| 1,555,544 | 9/1925 | Anthony | 242/117 |
| 2,019,512 | 11/1935 | Stahl | 254/271 |
| 2,053,976 | 9/1936 | Stahl | 254/375 X |
| 2,189,447 | 2/1940 | Martin | 242/117 |
| 2,363,393 | 11/1944 | Burnett | 242/117 |
| 2,584,099 | 1/1952 | Harkrader | 242/117 |
| 2,586,048 | 2/1952 | Hyatt | 242/117 |
| 2,661,130 | 12/1953 | Evans | 242/42.22 |
| 2,811,322 | 10/1957 | Wilkinson | 242/117 |
| 2,846,162 | 8/1958 | Allin, Sr. et al. | 242/117 |
| 3,135,478 | 6/1964 | Harlander | 242/117 |
| 4,059,197 | 11/1977 | Iida | 214/451 |
| 4,535,973 | 8/1985 | Dorr et al. | 254/323 |
| 4,544,136 | 10/1985 | Denman et al. | 254/323 |
| 4,625,947 | 12/1986 | Denman et al. | 254/323 |

*Primary Examiner*—Katherine Matecki

[57] ABSTRACT

The sheave and cable assembly includes a center sheave plate having an arcuate, cable-wrapping track and an exterior shoulder truncating the cable-wrapping track to accommodate a cable end fitting that is supported between adjacent sheave side plates for rotation relative to the sheave. The end fitting includes an outer, arcuate cable-wrapping shoulder which is generally contiguous with the cable-wrapping track on the center sheave plate when the end fitting is in a "cable wrap/unwrap" position in cooperative relation to the sheave center plate. This position of the cable end fitting permits wrapping of the cable on the track by rotation of the sheave in one direction and paying off (unwrapping) of the cable by rotation of the sheave in the opposite direction. When the cable is payed off the track and the sheave is rotated in a "wrong" direction (i.e., what normally is the cable unwrapping direction) in an attempt to wrap the cable on the track, the cable end fitting is rotatable to an "anti-reverse" position in non-cooperative relation to the center sheave plate. In the "anti-reverse" position, a shoulder on the cable end fitting bindingly engages the exterior shoulder on the sheave center plate to resist wrapping of the cable on the cable-wrapping track by rotation of the sheave in the "wrong" direction (cable unwrapping direction). This anti-reverse action of the cable end fitting supplements or replaces anti-reverse action provided by an anti-reverse pawl on the winch housing.

14 Claims, 3 Drawing Sheets

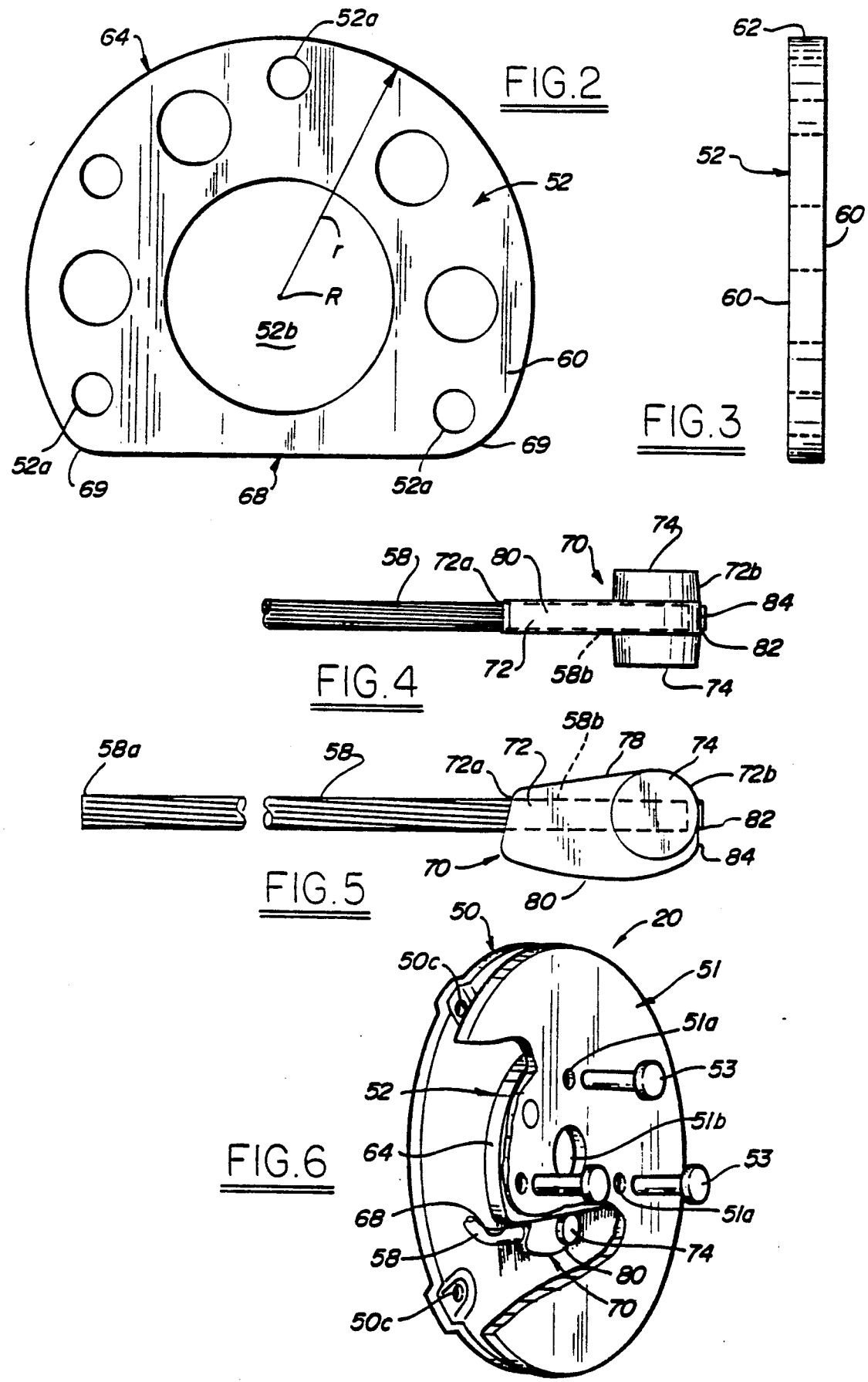

SHEAVE AND CABLE ASSEMBLY FOR A TIRE LIFT/CARRIER WINCH

This is a continuation of application Ser. No. 270,270, filed on Nov. 11, 1988, now abandoned.

FIELD OF THE INVENTION

The invention relates to a winch especially useful for a tire lift/carrier and, in particular, to a sheave and cable assembly for use in such a winch. A cable and a sheave plate for use in the sheave and cable assembly are also disclosed.

BACKGROUND OF THE INVENTION

Vehicle tire lift/carrier winch mechanisms have been used in the past to store a spare tire beneath a vehicle such as an automobile, truck and the like.

U.S. Pat. No. 4,059,197 issued Nov. 22, 1977, to Iida, U.S. Pat. No. 4,535,973 issued Aug. 20, 1985 to Dorr et al, U.S. Pat. No. 4,544,136 issued Oct. 1, 1985 to Denman et al and U.S. Pat. No. 4,625,947 issued Dec. 2, 1986, to Denman et al disclose winch mechanisms for tire lift/carriers wherein an eccentric gear arrangement is employed to provide a mechanical advantage in driving the sheave assembly of the winch in rotation to wind or unwind the cable connected to the spare tire carrier frame.

In these patented winch mechanisms, the sheave assembly typically includes a pair of sheave side plates maintained in spaced apart relation by suitable fasteners such as rivets and a rotatable sheave center plate having a peripheral edge forming a cable-wrapping track on which the cable is wrapped or unwrapped depending upon the direction of rotation of the sheave assembly. The spacing between the sheave side plates is selected to cause the cable to wind or wrap on itself as the sheave assembly is rotated.

The winch cable typically is attached to the sheave assembly by affixing an enlarged cylindrical sleeve member onto the cable end and forming side-by-side apertures in the sheave side plates and the sheave center plate to receive the enlarged sleeve member affixed on the cable end. In particular, the enlarged sleeve is dimensioned to extend into apertures in the sheave side plates and to ride on rims of the side plates defining the apertures therein as the sheave assembly is rotated.

SUMMARY OF THE INVENTION

The invention contemplates a sheave and cable assembly for a winch, such as a tire lift/carrier winch, wherein the sheave includes a sheave center portion (e.g., sheave center plate) disposed between first and second sheave side portions (e.g., sheave side plates) and having an outer, cable-wrapping track thereon between the first and second side portions. The cable includes a cable end disposed between the first and second side portions for rotation relative to the sheave and an anti-reverse means coupled to the cable end for rotation therewith between (1) a "cable wrap/unwrap" position in cooperative relation to said sheave for permitting wrapping of the cable on said track by rotation of the sheave in one direction and unwrapping of the cable by rotation of the sheave in the other opposite direction and (2) an "anti-reverse" position in non-cooperative relation to said sheave when the cable is payed off the track and the sheave is rotated in the aforementioned opposite direction (normally the cable unwrapping direction) in an attempt to wrap cable on the track. In the "anti-reverse" position, the anti-reverse means engages the sheave to resist wrapping of the cable on the track by rotation of the sheave in the "wrong" direction (i.e., the unwrapping direction).

The anti-reverse action of the anti-reverse means can supplement or replace an anti-reverse action provided by an anti-reverse mechanism of the winch.

In one embodiment of the invention, the anti-reverse means is secured on the cable end and is rotatably supported between the first and second sheave side portion. In this embodiment, the anti-reverse means on the cable end bindingly engages the sheave center portion when positioned in the "anti-reverse" position to resist wrapping of the cable on the track by rotation of the sheave in the "wrong" direction (cable unwrapping direction). In a preferred embodiment of the invention, the anti-reverse means comprises a cable end fitting means supported between the first and second side portions for rotation relative and opposite to the direction of sheave rotation. In the "cable wrap/unwrap" position, the cable end fitting means cooperates with the center portion in the wrapping and unwrapping of the cable on the track. In the "anti-reverse" position, an anti-reverse shoulder on the cable end fitting means bindingly engages the sheave center portion to position the end fitting means in a non-cooperative "anti-reverse" position transversely of the cable-wrapping track to resist cable wrapping by rotation of the sheave in the "wrong" direction.

In still another embodiment of the invention, the cable end fitting is positioned between the sheave and the winch housing in a manner to prevent wrapping of the cable by rotation of the sheave in the "wrong" direction.

The invention also contemplates a sheave and cable assembly for a winch, such as a tire lift/carrier winch, wherein a sheave center portion includes an outer peripheral edge forming an arcuate cable-wrapping track and further includes an exterior shoulder truncating the cable-wrapping track and wherein a cable end includes a cable end fitting means secured thereon and supported between first and second sheave side portions adjacent and outward of the exterior shoulder. The cable end fitting means includes an outer, arcuate, cable-wrapping shoulder that preferably is contiguous with the cable-wrapping track on the center sheave portion when the cable end fitting means is in the "cable wrap/unwrap" position. When the sheave is rotated, the cable is wrapped on or unwrapped from the cable-wrapping track of the sheave center portion and the cable-wrapping shoulder of the cable end fitting means.

In a preferred embodiment of the invention, the sheave includes a first side plate, a second side plate spaced from the first side plate and a center plate having the arcuate, cable-wrapping track on the periphery thereof and a flat, chordal, exterior shoulder truncating the cable-wrapping track. The cable includes an end fitting secured thereon, the end fitting having transversely extending ears on opposite sides rotatably received in a respective adjacent sheave side plate. The end fitting includes an outer, arcuate, cable-wrapping shoulder, an inner shoulder in spaced, facing relation to the exterior shoulder of the sheave center plate when the end fitting is in the cooperative "cable wrap/unwrap" position, and an anti-reverse shoulder between the inner and outer shoulders on an end of the cable end fitting remote from the cable end. The end fitting rotates relative and opposite to the sheave plates when the cable is payed out and the sheave is rotated in the "wrong" direction (opposite to the normal cable wind direction) in an attempt to wrap cable on the track and bindingly engages the exterior shoulder of the sheave center plate in the non-cooperative "anti-reverse" position to resist wrapping of the cable on the sheave. A unidirectional sheave and cable assembly is thereby provided.

The invention also contemplates a cable useful for a tire lift/carrier winch wherein the cable includes an improved cable end fitting with a cable-wrapping shoulder thereon.

The invention also contemplates a sheave plate useful for a tire lift/carrier winch wherein the sheave plate includes an arcuate, exterior cable-wrapping track and an exterior shoulder truncating the track to accommodate a cable end fitting secured between adjacent sheave plates.

BRIEF DESCRIPTION OF THE DRAWINGS

FIG. 2 is a side elevational view of the sheave center plate of the invention.

FIG. 3 is an edge elevational view of the sheave plate of FIG. 1.

FIG. 4 is a plan view of the cable and end fitting of the invention.

FIG. 5 is a side elevational view of the cable and end fitting of the invention.

FIG. 6 is a partially brokenaway, perspective view of the cable end fitting secured between the sheave side plates and positioned in the "cable wrap/unwrap" position.

BEST MODE OF PRACTICING THE INVENTION

Figure 1:
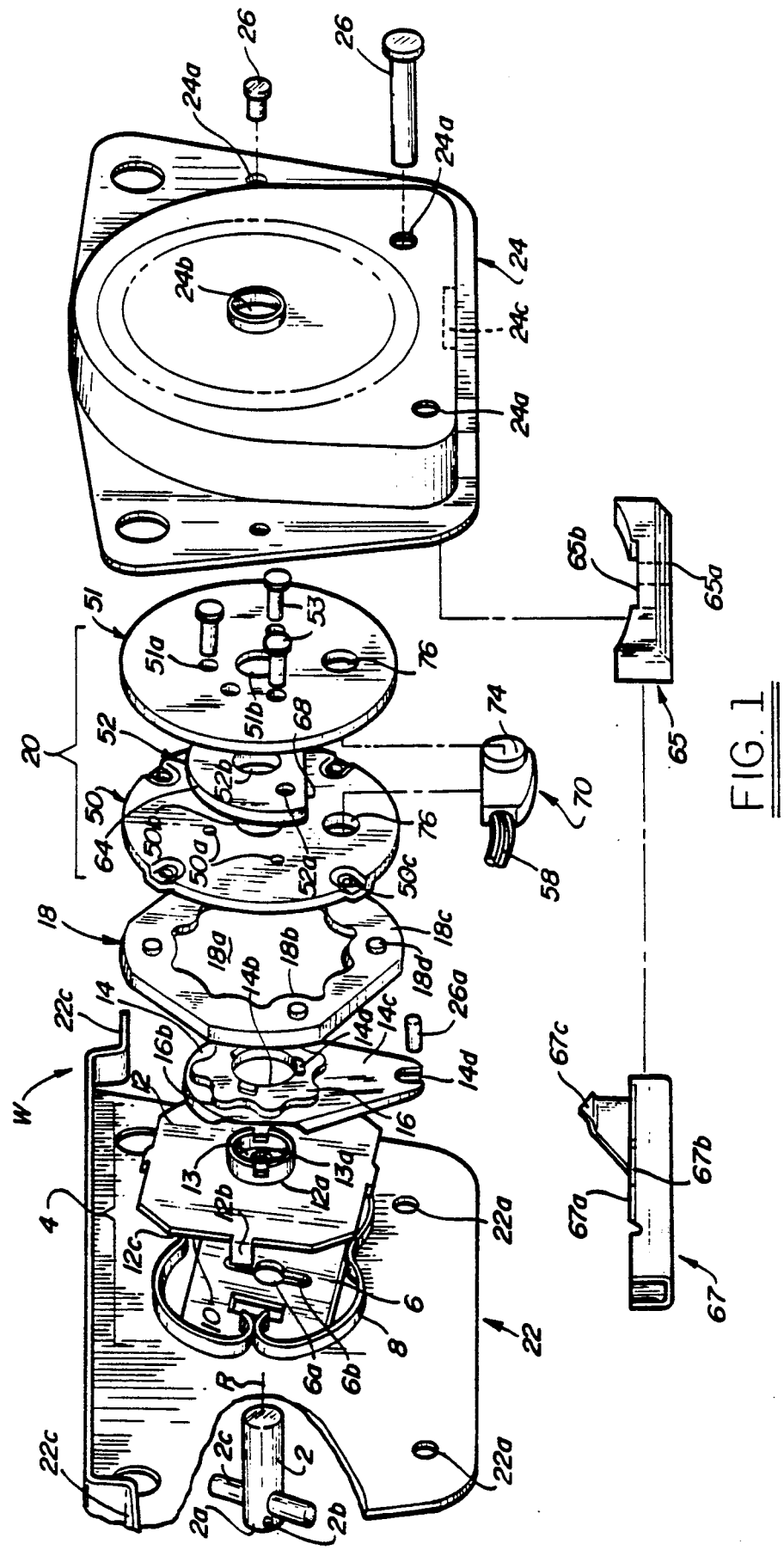
FIG. 1 is an exploded view of a tire lift/carrier winch in accordance with the invention with the cable end fitting shown enlarged in size relative to the sheave components.

Referring to FIG. 1, a tire lift/carrier winch W is shown including a drive shaft 2, a torque limiting assembly 4 having a spring plate 6 with springs 8,10 thereon and an eccentric plate 12 adjacent the spring plate, an eccentric cam 13, a torque arm 14 with a driving gear 16 attached thereon by bent tabs 14a of the torque arm, an annular driven gear 18 and a sheave assembly 20. These winch components are disposed in operative side-by-side relation on the drive shaft 2 between the opposing housing plates 22,24 that are connected together by suitable means, such as rivets 26, to enclose the winch components. Each housing plate 22,24 includes rivet-receiving holes 22a,24a to this end.

Each housing plate 22,24 includes respective coaxial apertures (only aperture 24b shown) to rotatably receive the opposite ends of the drive shaft 2 in a manner known in the art. One end 2a of the drive shaft 2 extends outside the housing plate 22 when the winch components are assembled and includes a cross bore 2b by which the drive shaft 2 can be rotated to lift or lower a vehicle tire carrier (not shown).

The drive shaft 2 extends through an opening 6a in the spring plate 6 and includes a diametral pin 2c received in driving relation in the cross slot 6b of the spring plate. The drive shaft 2 also extends through the opening 13a of the eccentric cam 13, which is press fit, keyed or other secured on the drive shaft 2 for rotation therewith.

The eccentric plate 12 includes a hub 12a extending axially toward the torque arm 14. The hub 12a receives and is keyed to the eccentric cam 13. The torque arm 14 includes an opening 14b receiving the hub 12a and the eccentric cam 13 therein and includes an extension 14c having an elongate slot 14d. The elongate slot 14d receives the intermediate shaft 26a of one of the rivets 26 holding the housing plates 22,24 together. The slotted extension 14c and intermediate shaft 26a of the rivet cooperate to impart oscillitory motion to the torque arm 14 and driving gear 16 thereon in known manner when the drive shaft 2 is rotated.

The annular driven gear 18 includes a central opening 18a receiving the driving gear 16 attached on the torque arm 14 and includes multiple inner teeth 18b that mesh with the outer teeth 16b of the driving gear 16. The driven gear 18 includes side face 18c facing the side plate 50 of the sheave assembly 20. The side face 18c of the driven gear includes a plurality of integrally formed studs 18d extending parallel to one another and to the axis of rotation R of the drive shaft 2.

The studs 18d are received in press fit in a respective coaxially aligned hole 50a formed in the side plate 50 in order to drive the sheave assembly 20 in rotation about axis R.

The sheave assembly 20 includes the side plate 50, another side plate 51 spaced therefrom, and a sheave center plate 52 and a cable 58 disposed between the side plates 50,51.

The sheave side plates 50,51 and sheave center plate 52 are joined together to form the sheave assembly 20 by three rivets 53 extending through aligned holes 50a,51a,52a in the respective sheave plates 50,51,52. Sheave plates 50,51,52 include a respective central opening 50b,51b,52b through which the drive shaft 2 extends. The sheave plates 50,51,52 are in bearing relation on the drive shaft 2.

In the winch shown in FIG. 1, rotation of the drive shaft 2 causes oscillation of the driving gear 16 as controlled by reciprocation of slotted extension 14b of the torque arm 14 relative to the intermediate rivet shaft 26a and a corresponding driving of the annular driven gear 18 in rotation about axis R. The annular driven gear 18 in turn drives the sheave assembly 20 in rotation through studs 18d press fit in holes 50c in the sheave side plate 50 to wind the cable 58 on the center sheave plate 52 when the sheave assembly 50 is rotated clockwise and to unwind the cable when the sheave assembly is rotated counterclockwise. This type of gear train and its operation are shown in the aforementioned U.S. Pat. Nos. 4,059,197 and 4,544,136, the teachings of which are incorporated by reference.

A cable guide member 65 is disposed in the housing plates 22,24 when the winch components are assembled. In particular, the cable guide 65 includes a slot 65a aligned with a slot 24c in the bottom wall of the housing plate 24. The cable 40 extends through these slots outside the housing toward the vehicle spare tire carrier (not shown).

An anti-reverse pawl 67 is also provided in the winch construction and includes a forked arm 67a with a slot 67b. The forked arm overlies flat surface 65b on the guide member 65 such that the slot 67b straddles the slot 65a. The cable 58 passes through the slot 67b as it exits or enters the winch W through the aforementioned slots 24c,65a. The pawl 67 also includes a pawl arm 67c which is adapted to engage the axially extending ears 12b on the eccentric plate 12 to prevent excessive rotation of the sheave assembly 20 in the unwind direction (counterclockwise rotation) and to prevent rewinding of the sheave assembly 20 in the wrong direction as fully explained in U.S. Pat. No. 4,535,973, the teachings of which are incorporated herein by reference. The ears 12b are centered on each of the four straight sides 12c of the eccentric plate 12.

The torque limiting assembly 4 allows the drive shaft 2 to free wheel in the event the cable 40 is subjected to an overload situation, such as in the event the tire lift/carrier has been fully lifted to it final position or obstructed in its movement for some reason. In particular, the drive shaft 2 is keyed to the spring plate 6 by the diametral pin 2b on the drive shaft. When an overload condition exists, the springs 8,10 deflect past the ears 12b on the eccentric plate 12 to permit free wheeling of the drive shaft 2. Allowing the drive shaft 2 to free wheel in such situations protects the other components of the winch from damage. Operation of such a torque limiting assembly is known in the art; e.g., as explained in U.S. Pat. No. 4,544,136.

The winch W is attached to the bottom of a vehicle by attachment flanges 22c on the housing 22 and by suitable fasteners (not shown) extending through holes provided in the flanges 22c.

Referring to FIGS. 2-5, the sheave center plate 52 includes substantially parallel side faces 60 and an outer peripheral edge 62 interconnecting the side faces 60. The aforementioned holes 52a are provided through the side faces 60 to receive the rivets 53 and the opening 52b is provided through the side faces 60 to receive the drive shaft 2 in bearing relation.

In accordance with the invention, the outer peripheral edge 62 of the center sheave plate 52 includes an arcuate cable-wrapping track 64 along a majority of its length (e.g., about 244° of the circumference) defined by a constant radius r and an exterior planar, chordal shoulder 68 on the peripheral edge truncating and interrupting the cable-wrapping track 64. The cable-wrapping track 64 and the exterior shoulder 68 intersect and are blended together by arcuate transition portions 69. The cable-wrapping track 64 of the sheave center plate 52 is disposed between the sheave side plates 50,51 which are provided with larger diameters than the sheave center plate 52 to form a narrow channel around the cable-wrapping track 64 when the winch components are assembled in operative side-by-side relation to force the cable 58 to wrap initially on the cable-wrapping track 64 and then on itself as the sheave assembly 20 is rotated about axis R.

The cable 58 includes a first free end 58a adapted for connection to a load such as a tire lift/carrier (not shown) known in the art and a second end 58b supported rotatably between the side plates 50,51. In particular, the second end 58b of the cable includes an end fitting 70 coupled thereto, e.g., crimped, die cast, molded or otherwise secured on or made integral with the end 58b. The end fitting includes a body 72 having an aft end 72a receiving the cable end 58b and an opposite forward end 72b. The longitudinal axis of the body 72 is generally aligned with the longitudinal axis of the cable end 58b. The body 72 includes a pair of oppositely transversely extending ears 74 that are rotatably received in an aperture 76 in each respective adjacent side plate 50,51 to rotatably support the end fitting 70 adjacent and outward of the exterior shoulder 68 between the side plates 50,51 for rotation relative to the sheave assembly 20 and in a direction opposite to the direction of sheave rotation as will be further explained.

Figure 7:
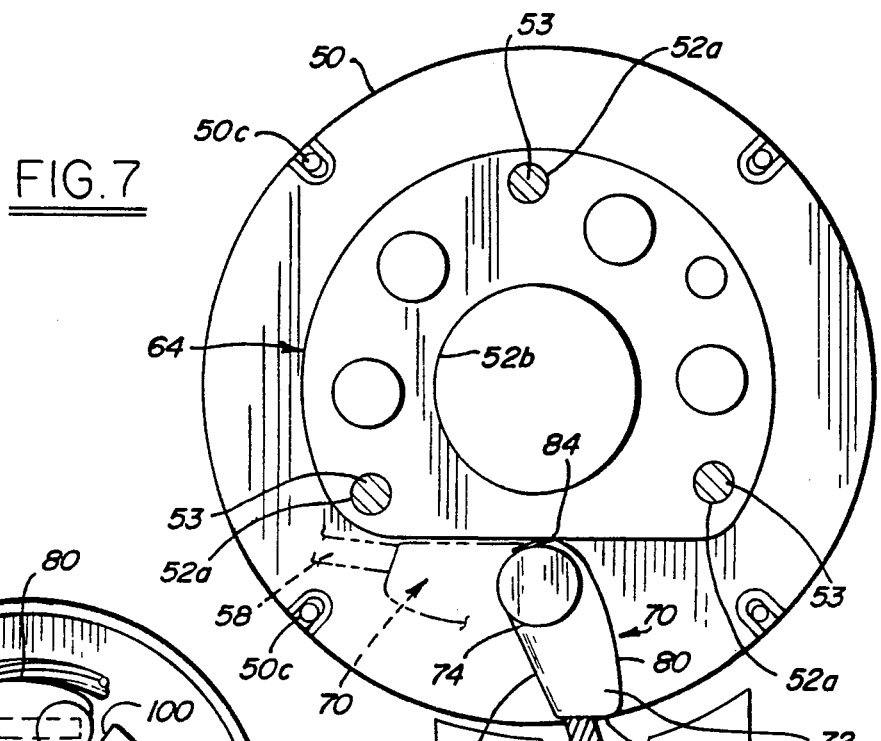
FIG. 7 is a side elevational view of the sheave with one side plate removed to show the cable end fitting and the exterior shoulder on the center plate engaged in an "anti-reverse" position to resist wrapping of the cable on the sheave by sheave rotation in the "wrong" direction.

The body 72 includes an inner flat, planar shoulder 78 in spaced, facing relation to the chordal shoulder 68 on the center sheave plate 52 and an outer, arcuate (radius defined), cable-wrapping shoulder 80 defining a cable-wrapping track segment or portion generally contiguous with cable-wrapping track 64 when the end fitting is in the "cable wrap/unwrap" position on center plate 52, shown in FIG. 6 and in FIG. 7 (in phantom). In this position, the cable 58 is wrapped/unwrapped on the cable-wrapping track 64 and the cable-wrapping shoulder 80 as the sheave assembly 20 is rotated in one direction or the other. In particular, in the "cable wrap/unwrap" position, the cable end fitting 70 cooperates with the cable-wrapping track 64 to allow unwrapping of the cable by rotation of the sheave assembly 20 in the clockwise direction and wrapping of the cable by rotation of the sheave assembly 20 in the counterclockwise direction.

The cable 58 typically comprises what is known as "aircraft cable" which includes multiple strands of zinc coated carbon steel wire formed into a wire cable of generally circular cross-section. However, the invention is not limited to "aircraft cable" and other types of cable, either multi-strand or single strand, can be used in the invention.

In operation, the sheave assembly 20 is rotated counterclockwise to wrap the cable 58 on the cable-wrapping track 64 of the center sheave plate 52 and the cable-wrapping shoulder 80 of the end fitting 70 to raise a load, such as a tire lift/carrier, attached to the end 58a to an elevated storage position on a vehicle. To lower the load, the sheave assembly 20 is rotated clockwise to pay out the cable 58 from the sheave assembly 20. The winch W is designed to return (raise) the load to its original elevated storage position on the vehicle by rewinding the cable 58 on the cable-wrapping track 64 and shoulder 60 by counterclockwise rotation of the sheave assembly 20 (this is referred to as the "right" direction for sheave rotation to rewind the cable). As mentioned hereinabove, the anti-reverse pawl 67 is operable to prevent rewinding of the cable 58 on the track 64 by rotation of the sheave assembly in the "wrong" direction (i.e., the clockwise direction of rotation) normally used to unwrap the cable.

To supplement or replace the anti-reverse action of the pawl 67, the body 72 of the end fitting 70 includes on the forward end 72b anti-reverse means in the form of transverse, anti-reverse shoulder 81. As best shown in FIG. 7, upon rewind of the sheave assembly 20 in the "wrong" direction (i.e., clockwise in FIG. 7) the end fitting 70 is rotated relative and opposite to the sheave center plate 52 to an "anti-reverse" position in non-cooperative relation to the center plate 52 where the anti-reverse shoulder 84 bindingly engages the exterior shoulder 68. This engagement of the anti-reverse shoulder 84 and the exterior shoulder 68 exerts a binding action between the to position the end fitting 70 in the non-cooperative "anti-reverse" position transversely of the cable-wrapping track 64 (FIG. 7) end fitting 70 and the sheave assembly 20 to position the end fitting 70 in the non-cooperative "anti-reverse" position transversely of the cable-wrapping track 64 (FIG. 7). The cable 58 is guided by the cable guide 65 and causes resistance to rotation of the sheave in the "wrong" direction as the cable resists being bent between end fitting 70 and cable guide 65. The increased resistance to rotation of the sheave assembly 20 in the "wrong" direction and thus to rewinding of the cable 58 in the "wrong" direction alerts the user that the sheave assembly 20 is being rotated incorrectly. This auxiliary anti-reverse action supplements, or replaces that of the anti-reverse pawl 67 if the pawl 67 does not engage properly for example as a result of excessive greasing thereof or improperly orientation of the pawl 67 relative to the cable 58. Typically, the anti-reverse shoulder 84 will rotate on the order of 110° about its own axis (defined by ears 74) before bindingly engaging the exterior shoulder 68 of the center plate 52.

The longitudinally protruding nose 82 on the forward end 72b of the body 72 is a result of the die casting or other molding process used to form (couple) the cable end fitting 70 on the cable end 88b. The nose 82 plays no role in effecting the anti-reverse action described hereinabove.

After the user of the winch is alerted that the cable is being incorrectly rewound, he can rewind the cable in the "right" direction (counterclockwise rotation of the sheave assembly 20). Upon such rewinding in "right" direction, the cable end fitting 70 will be rotated relative and opposite to the direction of sheave rotation to return to the "cable wrap/unwrap" position shown in FIGS. 6-7. Thus, the cable end fitting 70 by virtue of rotating relative and opposite to the direction of sheave rotation at certain times can move between the "cable wrap/unwrap" position and the "anti-reverse" position relative to the sheave center plate 52. Of course, during normal wrapping and paying out cable by rotation of the sheave in the "right" directions (e.g., counterclockwise for wrapping and clockwise for unwrapping), the cable end fitting 70 remains in the "cable wrap/unwrap" position.

Figure 8:
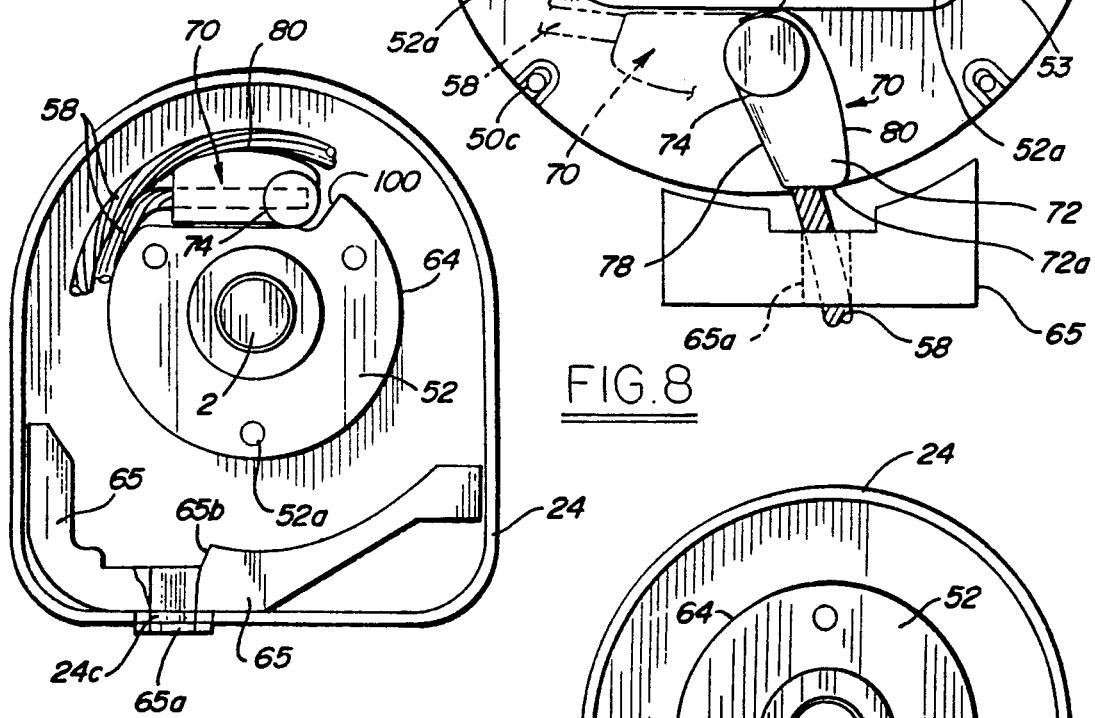
FIG. 8 is a side elevational view of another embodiment of the sheave and cable assembly of the invention with the cable end fitting shown in the "cable wrap/unwrap" position.
Figure 9:
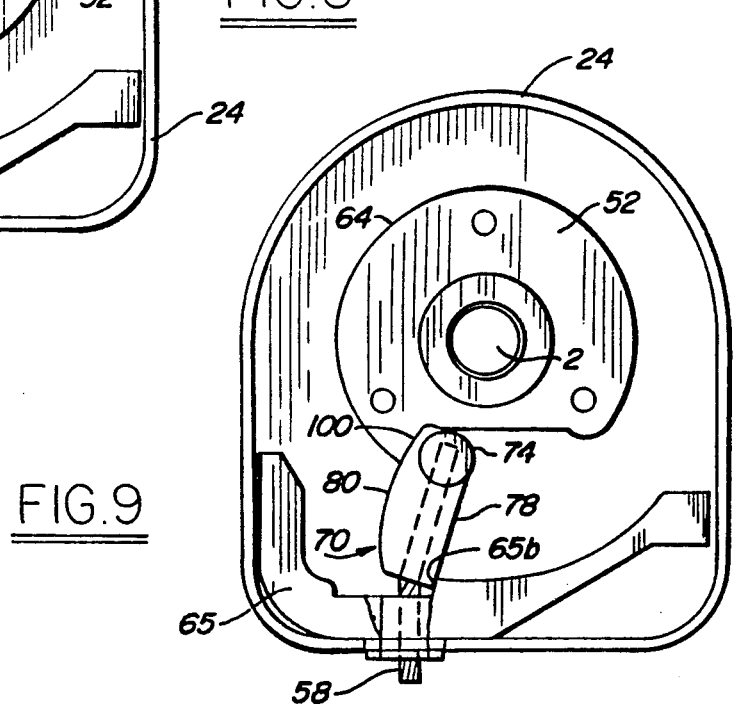
FIG. 9 is similar to FIG. 8 with the cable end fitting in the "anti-reverse" position between the center sheave plate and the winch housing to prevent wrapping of the cable on the sheave in the "wrong" direction of sheave rotation.

FIGS. 8-9 illustrate another embodiment of the invention differing from that described hereinabove. In this embodiment, the sheave assembly is designed to be rotated in the clockwise direction to wrap the cable 58 on the track 64 of the center sheave plate 52 and counterclockwise to unwrap the cable therefrom. The cable end fitting 70 is shown in the "cable wrap/unwrap" position in FIG. 8 and the "anti-reverse" position in FIG. 9 when the cable is payed off the track 64. A first radially extending anti-reverse shoulder 100 is formed on the sheave center plate 52 to engage the cable-wrapping shoulder 80 (functioning also as an anti-reverse shoulder) on the cable end fitting 70 when the end fitting is in the "anti-reverse" position of FIG. 9. As shown best in FIG. 9, when the cable end fitting 70 is in the "anti-reverse" position, the shoulder 80 on the cable end fitting 70 is engaged against the anti-reverse shoulder 100 on the center plate 60 and the inner shoulder 78 (functioning as a second anti-reverse shoulder) engages against a shoulder 65b on the cable guide member 65 of housing plates 22,24 to prevent rotation of the sheave assembly in the "wrong" direction (counterclockwise in FIG. 9) in the event the user attempts to wrap the cable 58 in the "wrong" direction. Cable end fitting 72 is thus trapped between the sheave assembly 20 and the housing plates 22,24 to prevent wrapping of the cable by rotation of the sheave assembly in the "wrong" direction.

In the "cable wrap/unwrap" position of FIG. 8, the end fitting 70 is disposed adjacent and outward of the exterior shoulder 68 on the center plate 52 with the cable-wrapping shoulder 80 contiguous with cable-wrapping track 64 on the center plate 52 to permit the cable to wrap or unwrap on the outer, arcuate, cable-wrapping shoulder 80 as well as the cable wrapping track 64 when the sheave assembly is rotated in the clockwise or counterclockwise direction, respectively, in accordance with the design of the winch.

It is apparent from FIGS. 8 and 9, that the cable end fitting 70 rotates relative and opposite to the center plate 52 to move between the "cable wrap/unwrap" position and the "anti-reverse" position.

While the invention has been described in terms of specific embodiments thereof, it is not intended to be limited thereto but rather only to the extent set forth hereafter in the following claims.

I claim:

1. A tire lift/carrier winch, comprising a fixed housing having a cable guide, and a sheave and cable assembly, said assembly comprising (a) a rotatable sheave disposed in the housing and having a first side portion, a second side portion spaced from the first side portion and a center portion including an outer cable-wrapping track between said first and second side portions, and (b) a cable guided into/out of the housing by the cable guide and having a cable end fitting means supported between said first and second side portions for rotation relative to said sheave between (1) a "cable wrap/unwrap" position in cooperative relation to said center portion for permitting wrapping of the cable on said track by rotation of said sheave in one direction and paying out cable relative to said track by rotation of sheave in the opposite direction and (2) an "anti-reverse"60 position transverse to said track where an anti-reverse surface on said cable end fitting means is in engagement with said center portion to limit rotation of said end fitting means relative to said sheave when the cable is payed off said track and said sheave is rotated in said opposite direction in an attempt to wrap cable on said track such that wrapping of said cable on said cable-wrapping track by rotation of said sheave in said opposite direction is resisted when said cable end fitting means is positioned in said anti-reverse position and said cable is guided by said cable guide.

2. The sheave of claim 1 wherein said cable end fitting means is supported between said side portions for rotation relative and opposite to the direction of rotation of said sheave.

3. The assembly of claim 1 wherein said cable end fitting means includes an outer cable-wrapping shoulder cooperatively positioned relative to said cable-wrapping track to receive cable thereon when said cable end fitting means is in said "cable wrap/unwrap" position.

4. The assembly of claim 3 wherein said outer cable-wrapping shoulder is positioned generally contiguous with said cable-wrapping track when said cable end fitting means is in the "cable wrap/unwrap" position.

5. The assembly of claim 4 wherein said outer cable-wrapping shoulder is an arcuate shoulder contiguous with said arcuate cable-wrapping track.

6. The assembly of claim 1 wherein said cable end fitting means includes an elongated body having one end with an anti-reverse shoulder that is bindingly engaged with said center portion when said cable end fitting means is in the "anti-reverse" position and an opposite end engaged solely with the cable when said cable end fitting means is in said "anti-reverse" position.

7. The assembly of claim 6 wherein said body includes a cable-wrapping shoulder disposed between the ends and positioned transversely to said cable-wrapping track when said cable end fitting means is in the anti-reverse position.

8. The assembly of claim 1 wherein said first and second side portions comprise first and second side plates.

9. The assembly of claim 8 wherein the center portion comprises a center plate fastened between the side plates and having a smaller diameter than said side plates.

10. A sheave and cable assembly useful for a tire lift/carrier winch and having an axis of rotation, comprising (a) a sheave having a first side portion, a second side portion spaced from the first side portion and a center portion between the first and second side portions, said center portion having an outer peripheral surface defining an arcuate cable-wrapping track between said first and second side portions and having an exterior shoulder thereon truncating the arcuate cable-wrapping track between said first and second side portions, and (b) a cable having a cable end fitting means with an outer cable-wrapping shoulder, said cable end fitting means being supported between said first and second side portions for movement to a position adjacent said exterior shoulder such that said cable is wrapped on said cable-wrapping track and said cable-wrapping shoulder as the sheave is rotated about said axis of rotation and to another position transverse to said exterior shoulder as the sheave is rotated about said axis of rotation in an opposite direction.

11. The assembly of claim 10 wherein said cable-wrapping shoulder is generally contiguous with the cable-wrapping track on said center portion when said cable end fitting means is moved to said position adjacent said shoulder.

12. The assembly of claim 11 wherein said cable-wrapping shoulder is arcuate in profile.

13. The assembly of claim 11 wherein said exterior shoulder comprises a chordal shoulder on said center portion.

14. A winch, comprising a fixed housing having cable guiding means and a sheave and cable assembly, said assembly comprising (a) a rotatable sheave disposed in the housing and having a first side portion, a second side portion spaced from the first side portion and a center portion including an outer cable-wrapping track between said first and second side portions, and (b) a cable guided by the cable guiding means and having a cable end fitting means supported between said first and second side portions for rotation relative to said sheave between (1) a "cable wrap/unwrap" position in cooperative relation to said center portion for permitting wrapping of the cable on said track by rotation of said sheave in one direction and paying out cable relative to said track by rotation of said sheave in the opposite direction and (2) and an "anti-reverse" position transverse to said track where anti-reverse means operatively connected to said cable end fitting means is in engagement with said sheave to limit rotation of said end fitting means relative to said sheave when the cable is payed off said track and said sheave is rotated in said opposite direction in an attempt to wrap cable on said track such that wrapping of said cable on said cable-wrapping track by rotation of said sheave in said opposite direction is resisted when said cable end fitting means is positioned in said anti-reverse position and said cable is guided by said cable guiding means.

* * * * *

UNITED STATES PATENT AND TRADEMARK OFFICE
CERTIFICATE OF CORRECTION

PATENT NO. : 5,125,628
DATED     : June 30, 1992
INVENTOR(S) : Rempinski et al.

It is certified that error appears in the above-identified patent and that said Letters Patent is hereby corrected as shown below:

Column 4, line 63, delete "50" and insert -- 20 --.

Column 6, line 65, delete "81" and insert -- 84 --.

Column 7, lines 6 through 8 (Amendment dated 1/12/92), delete "to position the end fitting 70 in the non-cooperative "anti-reverse" position transversely of the cable-wrapping track 64 (Figure 7)".

Column 8, line 47, (Amendment dated 10/25/91), delete "60".

Signed and Sealed this

Eighth Day of November, 1994

Attest:

BRUCE LEHMAN

Attesting Officer         Commissioner of Patents and Trademarks